Dec. 18, 1923.  1,478,334

H. GREFE

PROFILING MACHINE

Filed April 19, 1921   5 Sheets-Sheet 1

Inventor:
H. Grefe
by
Attorney

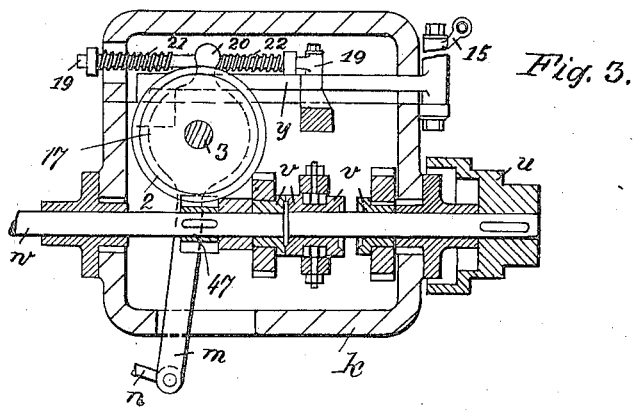
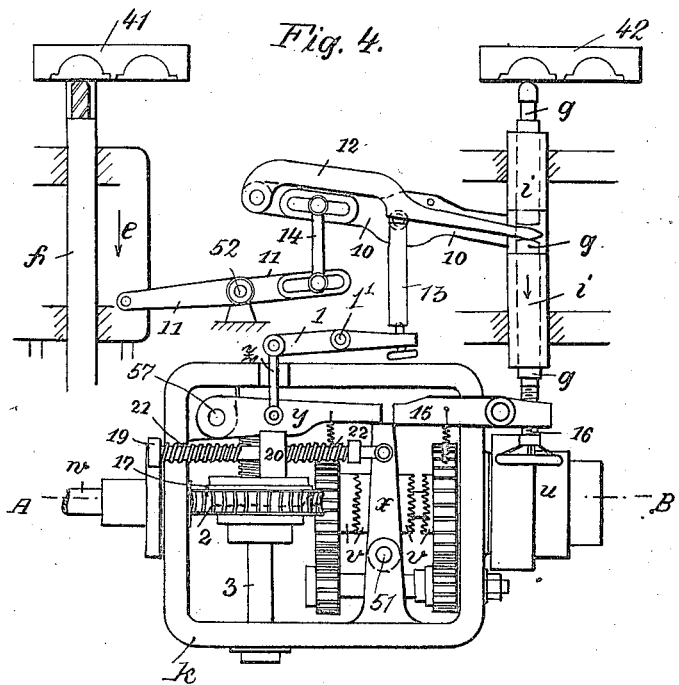

Dec. 18, 1923.  
H. GREFE  
1,478,334  
PROFILING MACHINE  
Filed April 19, 1921  5 Sheets-Sheet 4

Inventor:
H. Grefe.
by
Attorney.

Dec. 18, 1923.	1,478,334
H. GREFE
PROFILING MACHINE
Filed April 19, 1921   5 Sheets-Sheet 5
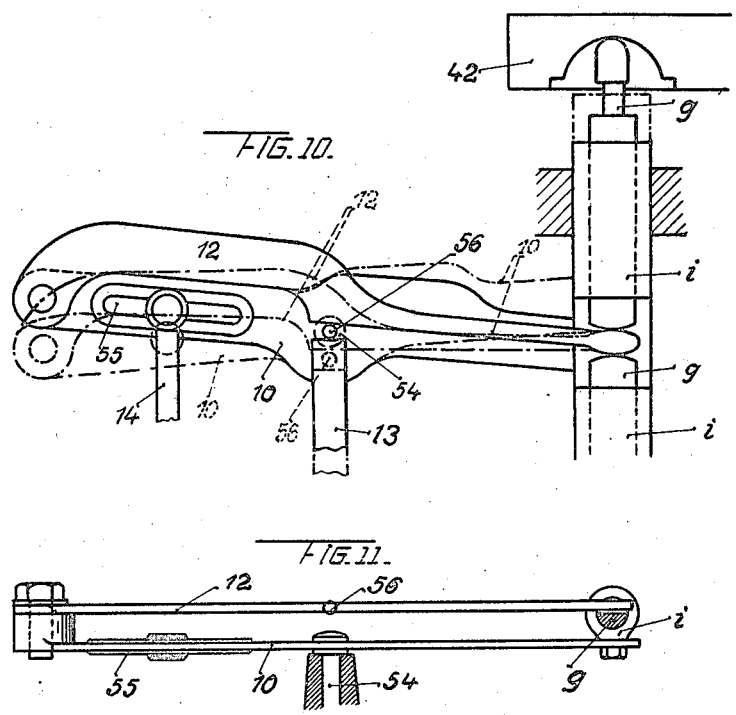
Inventor
H. Grefe Patented Dec. 18, 1923.

1,478,334

UNITED STATES PATENT OFFICE.

HUGO GREFE, OF LUDENSCHEIDT, GERMANY.

PROFILING MACHINE.

Application filed April 19, 1921. Serial No. 462,599.

(GRANTED UNDER THE PROVISIONS OF THE ACT OF MARCH 3, 1921, 41 STAT. L., 1313.)

*To all whom it may concern:*

Be it known that I, HUGO GREFE, a citizen of the German Republic, and a resident of Ludenscheidt, Westphalia, Germany, have invented certain new and useful Improvements in or Relating to Profiling Machines (for which I have filed application in Germany, Feb. 8, 1919, #47,786), of which the following is a specification.

In order to automatically profile dies for drop-forging or other irregularly shaped parts upon a milling machine, it has been the custom to use a so-called profiling or engraving machine in which a guide finger placed under the action of a weight or the like is adapted to move along a template and to thereby cause the spindle of the milling cutter to move accordingly. The template, in such case, must be sufficiently strong to withstand the sliding pressure incurred, and it must therefore consist of a comparatively hard material. When there are accentuated curves, the template must be correspondingly enlarged in order to decrease the angle of incline. In most cases, however, in which only one single work piece is to be produced, it will not be worth while to go to the trouble of making a special template for this purpose.

The object of this invention consists in a machine for the purpose specified above which, however, is not intended to be used for having the workpieces completely machined, but only for an automatic preliminary work or rough-planing. In order now to be able also to economically machine single work pieces one of the main conditions has to be fulfilled which consists of directly forming the template from the original in as simple a manner as possible, without the risk of the latter being destroyed by heat or other causes. Thus, the template may be made of gypsum, wax or some other similar soft substances capable of withstanding only moderate pressure.

A machine constructed in accordance with this invention would operate in the following way: An ordinary milling cutter is, for example, employed to drill a number of holes very close to each other into the workpiece, which holes, according to the configuration of the template, would be of different depths. The holes partly overlap each other and are arranged in a spiral line. The feed of the cutter is a positive one and is automatically interrupted as soon as the required depth has been attained. For this purpose a suitably shaped feeler is advanced together with the milling cutter. This feeler comes to rest as soon as it has reached the template, whilst the hollow shaft which surrounds it in such a manner that the said feeler is moved by frictional contact, will continue its movement. A suitable lever arrangement is provided for the purpose of thereby reversing the drive which, in turn, reverses the movement of the tool slide. At the same time the workpiece and the template are fed transversely to the direction of the tool- and feeler-feed by means of a suitable shifting device in such a manner that the milling cutter on being reversed by encountering an abutment on its return movement will be able to work upon a new part of the workpiece. The feeding of the workpiece hereby takes place only for such an extent that the drill holes produced will partly overlap each other. The feeler need only withstand a moderate pressure, independent of the size of the milling cutter, so that the production of templates from soft materials is rendered possible.

In the drawings affixed to this specification and forming part thereof two forms of construction of a machine embodying my invention are llustrated by way of example. In the drawings—

Fig. 2 is a plan view of the one form of construction, while

Fig. 3 shows a vertical cross section according to line A—B of Fig. 4 through the gear box on an enlarged scale, Fig. 4 is a plan view of Fig. 3 the cover of the gear box being removed.

Fig. 10 is a side elevation of the levers 10 and 12 on an enlarged scale.

Fig. 11 is a front elevation of Fig. 10 partly in section.

Figure 1:
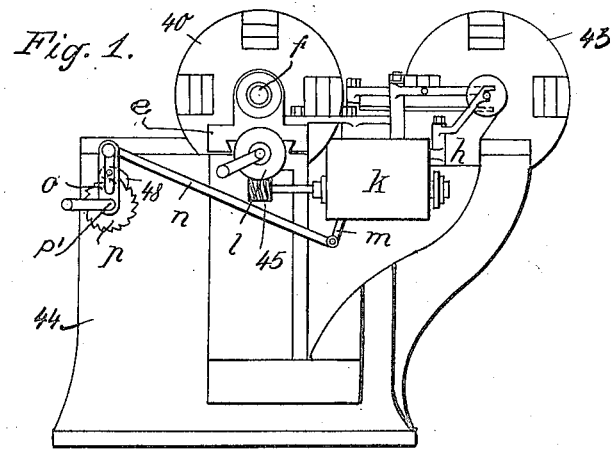
Fig. 1 is a side elevation.
Figure 2:
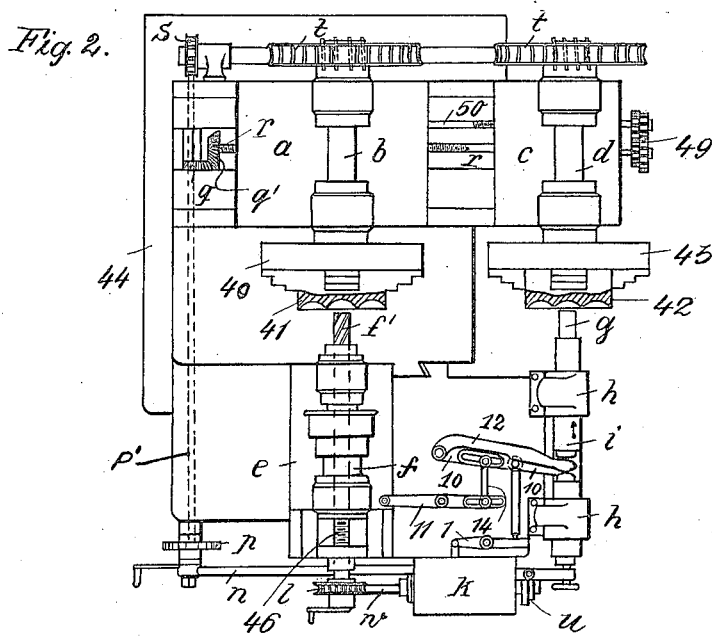
Figure 5:
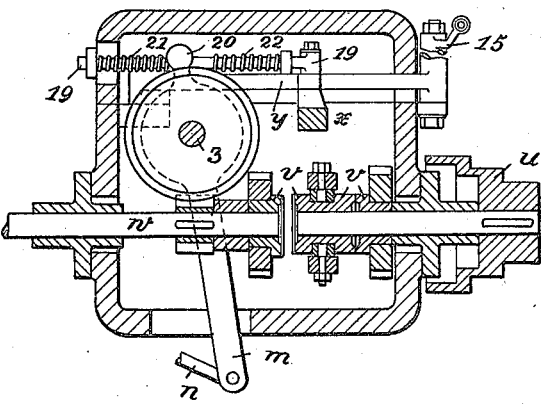
Figs. 5 and 6 are a cross section and a plan view respectively similar to those illustrated in Figs. 3 and 4 showing the parts during forward movement shortly before commencement of the return stroke.

Referring to Figs. 1–6 of the drawings, $a$ is the table or slide on which the spindle $b$ is journaled. The spindle $b$ bears a chuck 40 for holding the work-piece 41. The template 42 is supported by a chuck 43 fastened on a spindle $d$ journaled on a table or slide $c$. The tables $a$ and $c$ are slidably mounted on the frame 44 of the machine.

The tool $f^1$ is fastened on the tool spindle $f$ journaled on the tool slide $e$ slidably supported by the frame 44. Rigidly connected with the frame 44 there are two bearings $h$ in which the hollow spindle $i$ is journaled supporting the feeler or copying pin $g$.

Movement is imparted to the said slides from the driving pulley $u$, the spindle of which may be connected by means of a clutch $v$ contained in the gear box $k$ with the driving spindle $w$. On the spindle $w$ there is fixed a worm 45 engaging the worm wheel 1 on the feed-spindle 46 of the tool slide $e$. The spindle $w$ further bears a worm 47 (Figs. 3 and 5) engaging a worm wheel 2 loosely rotatable upon a shaft 3 in the gear box $k$. The worm wheel 2 is in frictional contact with a friction disc 17, to which is attached a forked lug 20 surrounding a shaft 19, and which is also provided with an arm $m$ pivotally connected to the one end of a rod $n$, the other end of which is pivoted to an oscillating lever $o$ bearing a pawl 48 (Fig. 1) engaging a ratchet $p$. On the spindle $p^1$ there is fixed a bevel wheel $q$ engaging a similar bevel wheel $q^1$ fixed upon a spindle $r$ which effects the lateral feed displacement of the work-piece. For effecting the rotary-movement of the spindles $b$ and $d$ these spindles are connected by means of worm gears $s$ and $t$ with the mentioned spindle $p^1$ bearing the ratchet wheel $p$ and bevel wheel $q$. The lateral displacement of the slide $c$ and spindle $d$ is effected by the spindle $r$ connected by gearings 49 with the feed spindle 50 of said slide $c$. The clutch $v$ is operated upon by the lever $x$ journaled about the pin 51 which, in its working position, is held by lever $y$ (Fig. 6) and in its position of back motion by the lever 15 (Fig. 4).

Figure 6:
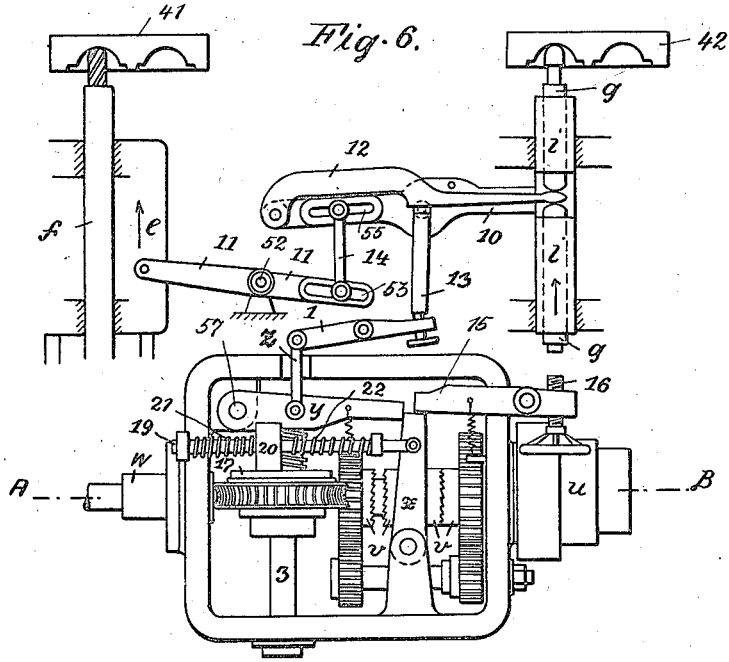

During the forward motion of the tool carrier $e$ with its spindle $f$, shown by the arrow in Fig. 6, the hollow spindle $i$ is moved in the same direction by means of levers 11, 14 and 10. For this purpose the lever 11 is fulcrumed about the bolt 52 fixed on the machine frame. The one end of the lever 11 is pivoted to the slide $e$, while its other end is provided with a slot 53. The lever 10 is fulcrumed about the bolt 54 (see also Fig. 10) fixed on the machine frame. The one end of it is pivotally connected to the hollow spindle $i$ and the other end to a lever 12. Near to last named end there is a slot 55. A member 14 having at the ends bolts or the like engaging the slots 53 and 55 connects the two levers 10 and 11. The free end of the lever 12 is in engagement with the copying pin or feeler $g$. The feeler $g$ is journaled within the hollow spindle $i$ so as to be longitudinally displaceable and is caused to move by frictional contact with the said hollow spindle. Lever 12 is provided with a steel ball 56 which is in engagement with a rod 13. As long as the levers 10 and 12 remain in the position shown in Figs. 4 and 6 or swing commonly about the pivot 54, the ball lies exactly above the pivot 54 so that the rod 13 is not moved. Only after the movement of the feeler $g$ has been stopped by the said feeler coming into contact with the template 42, the said steel ball will leave its central position, when the hollow spindle $i$ continues moving owing to the fact that the end of the lever 12 being in engagement with the feeler $g$ comes at a standstill, so that then the point of rotation of lever 12 lies in the axis of the feeler, the latter being at rest. The rod 13 is in engagement with a lever $l$, swinging about the axis $l^1$ and being pivotally connected with a rod $z$ pivoted to the lever $y$. The lever $y$ swings about a pin 57.

The coupling lever $x$ connects with the shaft 19 which is surrounded by the two spiral springs 21 and 22.

On the rotation of the friction disc 17 in either direction, spring 21 or 22 will be tensioned as the case may be for enabling them to move the lever $x$, and the arm $m$ will thereby cause the advance of the work-piece by the operation of the intermediate members $n$, $o$ and $p$.

Fig. 4 shows the position at the end of the return motion. The extent of return motion of spindle $i$ and feeler $g$ may be adjusted by means of the set screw 16. In the position shown, the lever 15 is just in the position to be released, and spring 22 which has been tensioned by means of the friction disc 17, is now ready to start a new working operation.

Fig. 6 shows the position at the end of the working stroke. On the continued movement of the hollow spindle $i$ the rod 13 is pushed back, thus causing lever $y$ to release its contact on lever $x$, which now is free to reverse the movement of the gear. Spring 21 being under tension causes the return of lever $x$ into its position of reversed motion.

The device illustrated in Figs. 1 to 6 operates to produce one cut in a piece of work corresponding to a similar part of the template in the following manner. The spindles $f$ and $i$, shown in Fig. 4, are moved in the backward direction by the reverse engagement of the clutch $v$, the friction disc 17 tensioning the right hand spring on shaft 19 for throwing the lever $x$ and clutch $v$ out of engagement as soon as lever 15 rides off the end of lever $x$ caused by the part $g$ engaging lever 15. The lever 15 releasing lever $x$ as above stated, said lever $x$ will be operated to cause the clutch $v$ to engage for driving the spindles forward, the forward movement changing the rotation of gear wheel 2 which rotates the friction disc in a counter-clockwise direction, operating levers $m$, $n$ and $o$ and ratchet $p$ for moving slides $a$ and $c$ and rotating spindles $b$ and $d$ to position the blank and template for the next cut. The arm 12 pushes the feeler forward through the tension of the spring acting on lever $y$ and its connections with arm 12, lever $y$ holding the clutch $x$ in forward driving engagement and the movement of disc 17 tensioning the spring at the left hand side on shaft 19 to throw the clutch to reverse at the end of the cut, as shown in Fig. 6. As the cut progresses the movement of slide $e$ forward effects a similar movement of slide $i$ through levers 10, 11 and 14, and as the bottom of the cut is reached, similar to that in the template, the ball 56 will be moved back until its center is directly over the center or in axial alignment with pivot 54. At this point lever $y$ is operated through the movement of slide $i$ to release clutch lever $x$, when it is thrown for reversing the clutch.

Figures 7, 8, 9:
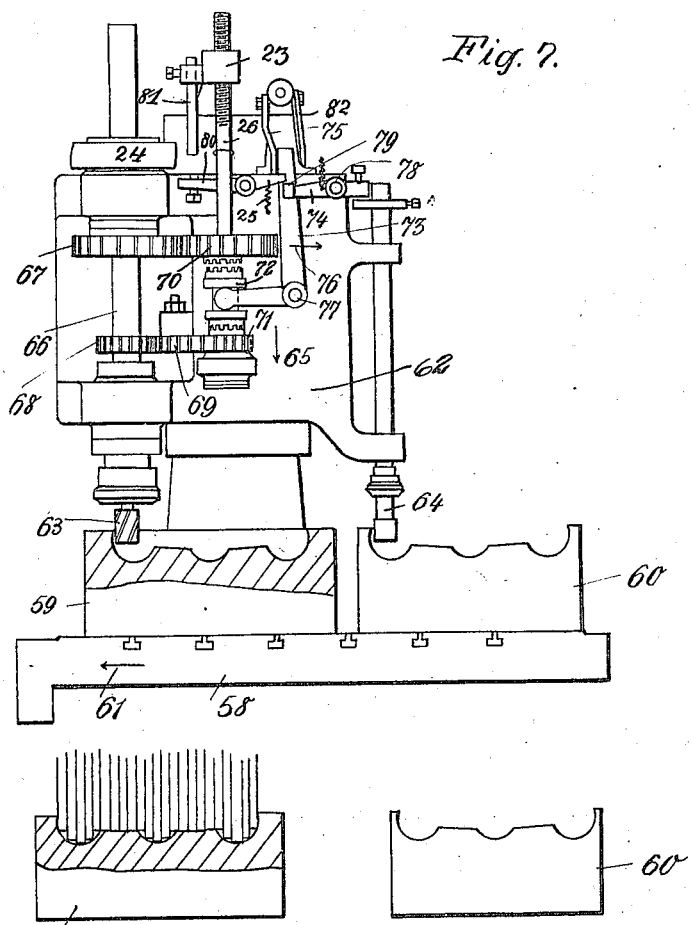
Fig. 7 is a side elevation of a second form of construction of a machine embodying my invention.
Fig. 8 shows the work-piece and indicates the working.
Fig. 9 illustrates the corresponding template.

In Fig. 7 the simplest form of machine (without table feed) is illustrated. This machine consists firstly of a table 58 for carrying the work-piece 59 and the template 60 and which is adapted to move in the direction of the arrow 61 and secondly of the tool carrier 62 supporting the spindle 66 with the milling cutter 63 and the feeler or copying pin 64 which are both moved in the direction of the arrow 65.

The spindle 66 is rotated by means of a pulley 24 and bears two gear wheels 67 and 68 engaging directly or by means of an intermediate gear wheel 69 two gear wheels 70 and 71 respectively, loosely mounted on the feed spindle 26. Each of the wheels 70 and 71 is connected with a clutch part capable of being coupled with a clutch 72. This clutch is not rotatable but is longitudinally displaceable to connect with the feed spindle 26 which is engaged with a nut 23 fixed on the machine frame. In the position shown, the slide 62 is moved by the rotation of the spindle 26 in the direction towards the work piece 59 as indicated by the arrow 65. Clutch 72 is controlled by a bell crank lever 73 which swings about the pivot 77 fixed on the slide 62 and which, in its turn, is influenced by a tension spring 75. A lever 74 which bears against a projection 79 on the spring controlled bell crank lever arm, prevents the lever 73 from moving in the direction of the arrow 76. When the feeler 64 encounters the template 60 it will stay at rest, as it is only frictionally journaled within the slide 62, whereas the said slide continues on its movement. This results in that lever 74 is caused to swing about its pivot 78 and to slip from the cam surface, whereupon the spring 75 will move lever 73 in the direction of the arrow and couple the gear wheel 70 with the clutch 72, thereby causing the reversing of the feed movement. In this position of the lever 73 the spring 25 draws the lever 80 pivotally connected with slide 62 in front of the projection 79 on lever 73, and thus prevents its springing back until, on the continued return movement of slide 62, the abutment pin 81 releases lever 80, so that the spring 82 which meanwhile has been tensioned by a tensioning mechanism (not shown) returns the lever 73 into its working position which is shown in the drawings, and so that the advance of slide 73 is again commenced in the direction indicated by the arrow. Table 58 has in the meantime been shifted and the work-piece advanced, so that it is now treated at some other position.

Adjustment of the stroke of the feeler $g$, when carrying out reducing work, is effected by a displacement of link 14 (Figs. 4 and 6) within the slots 53 and 55 of levers 10 and 11.

The invention is shown in preferred form and by way of example only and as applied to the particular kind of machine described, but obviously many modifications and alterations therein and in its mode of adaptation will suggest themselves to those skilled in the art and still be comprised within its scope.

What I claim is:

1. In a profiling machine having means for rough-milling work-pieces according to templates by producing a number of holes partly overlapping each other in combination a tool carrying slide, means for imparting feed-movement to said slide, a feeler device containing a feeler and a carrier for same, interposed means between said feeler device and the said slide causing the latter to positively move the said carrier in accordance with its own movement but leaving the feeler at rest if the latter contacts the template, a coupling device coupling the said slide with the means for imparting the feed movement and containing a reverse gear and means for shifting the said coupling device and reversing the feed movement controlled by the movement of the said feeler relatively to the said carrier.

2. In a profiling machine having means for rough-milling work-pieces according to templates by producing a number of holes partly overlapping each other in combination a tool carrying slide, means for imparting feed-movement to said slide, a feeler device containing a feeler and a carrier for same, interposed means between said feeler device and the said slide causing the latter to positively move the said carrier in accordance with its own movement but leaving the feeler at rest if the latter contacts the template, means for reversing the movement of the said slide and carrier controlled by the movement of the said feeler relatively to the said carrier and an abutment causing another reversal of the motion, so that the said slide and carrier recommence their working stroke.

3. In a profiling machine having means for rough-milling work-pieces according to templates by producing a number of holes partly overlapping each other in combination a tool carrying slide, means for imparting feed-movement to said slide, a feeler device containing a feeler and a carrier for same, interposed means between said feeler device and the said slide causing the latter to positively move the said carrier in accordance with its own movement but leaving the feeler at rest if the latter contacts the template, means for reversing the movement of the said slide and carrier controlled by the movement of the said feeler relatively to the said carrier, and an adjustable abutment causing another reversal of the motion, so that the said slide and carrier recommence their working stroke.

4. In a profiling machine having means for rough-milling work-pieces according to templates by producing a number of holes partly overlapping each other in combination a tool carrying slide, a feeler, a carrier for said feeler, means to positively move said carrier simultaneously with the said tool carrying slide, said feeler being movable within said carrier and arranged so as to cease movement on its encountering the template; means to continue the movement of the tool carrying slide and of the carrier after the stoppage of the feeler, a clutch, a reverse gear to enable the said slide and carrier to move in either direction, a set of levers intermediate the clutch on the one side and the tool slide and the feeler carrier on the other side shifting the said clutch and controlled by the continued movement of the slide and carrier, and an abutment causing a re-commencement of the advance movement at the end of the return stroke.

5. In a profiling machine having means for rough-milling work-pieces according to templates by producing a number of holes partly overlapping each other in combination a tool carrying slide, a feeler carrier, means for positively moving said carrier simultaneously with the said tool carrying slide, a feeler frictionally movable within said carrier in a longitudinal direction and arranged so as to cease movement on its encountering the template, means to continue the movement of the tool carrying slide and of the carrier after the stoppage of the feeler, a reverse gear box, a clutch within said gear box, a spring controlled lever to operate said clutch, a set of levers intermediate the gear box on the one side and the tool carrying slide and the carrier on the other side controlled by the said continued motion, means to adjust said levers, and an abutment causing a recommencement of the advance movement at the end of the return stroke.

6. A profiling machine with means for rough-milling work-pieces according to templates by producing a number of partly overlapping holes having in combination with a template, a tool slide, a feeler longitudinally and frictionally movable within a holder, means for positively and simultaneously advancing the said holder and the tool slide which both continue their movement after the feeler has come to rest on coming into contact with the template, means actuated by said continued movement so as to effect the reversal of a clutch and the consequent reversal of movement of the said slide and holder and an abutment to again alter the reverse motion of the said slide and holder into forward motion by contact with the feeler at the end of the return stroke.

7. In a profiling machine with means for rough-milling work-pieces according to templates the combination of a feeler frictionally movable within a holder, a tool slide, means to move said slide in synchronism with said holder, a reverse gear, a clutch operating said reverse gear, springs actuating said clutch lever and adapted to be alternately tensioned during advance and return of the said slide, means to positively start the return motion of the machine on the feeler encountering the template and an abutment to cause re-commencement of forward motion by contact with the feeler at the end of the return motion.

8. In a profiling machine with means for rough-milling work-pieces according to templates the combination of a feeler frictionally movable within a holder, a tool slide, means to move said slide in synchronism with said holder, a reverse gear, a clutch lever operating said reverse gear, springs actuating said clutch lever, means containing a friction device to alternately tension said springs during advance and return of the said slide, means to positively start the return motion of the machine on the feeler encountering the template and an abutment to cause re-commencement of forward motion by contact with the feeler at the end of the return motion.

9. In a profiling machine with means for rough-milling work-pieces according to templates the combination of a feeler frictionally movable within a holder, a tool slide, means to move said slide in synchronism with said holder, a reverse gear, a clutch lever, operating said reverse gear, springs actuating said clutch lever, means containing a friction device to alternately tension said springs during advance and return of the said slide, means operated by said friction device and effecting an intermittent rotation and simultaneous feeding of the work-piece and the template.

10. In a profiling machine with means for rough-milling work-pieces according to templates, the combination of a feeler frictionally movable within a holder, a tool slide, means to move said slide in synchronism with said holder, a reverse gear, a clutch lever operating said reverse gear, springs actuating said clutch lever, means containing a friction device to alternately tension said springs during advance and return of the said slide, means operated by said friction device and effecting an intermittent rotation and simultaneous feed of the work-piece and the template, means to positively start the return motion of the machine on the feeler encountering the template and an abutment to re-commence forward motion by contact with the feeler at the end of the return motion.

11. In a profiling machine for rough-milling work-pieces, the combination with a template of a tool slide, a feeler, a holder for said feeler, a gear box, means to impart movement to the gear in said gear box, a clutch, spring-controlled means to operate said clutch, two double-armed levers between said holder and said tool slide, slots within the one arm of said double-armed levers, a rod engaging said slots and adjustably connecting said levers, the other arm of the levers being connected with the said slide and holder respectively, and a pivoted lever being in engagement with the feeler and pivoted to and arranged above the double-armed lever which is in connection with the said holder.

12. In a profiling machine for rough-milling work-pieces the combination with a template of a tool slide, a feeler, a holder for said feeler, a gear box, means to impart movement to the gear in said gear box, a clutch, spring-controlled means to operate said clutch, two double-armed levers between said holder and said tool slide, slots within the one arm of said double-armed levers, a rod engaging said slots and adjustably connecting said levers, the other arms of the levers being connected with the said slide and holder respectively, a pivoted lever being in engagement with the feeler and pivoted to and arranged above the double-armed lever which is in connection with the said holder, means to cause said pivoted lever to turn about the same axis with the last mentioned double-arm lever during forward and return motion and to be displaced in the direction opposite that of the feed on the feeler coming into contact with the template and means operated by said pivoted lever to cause the release of the clutch lever and its shifting into its next operative position.

HUGO GREFE.